United States Patent
Stewart et al.

(10) Patent No.: US 11,851,856 B2
(45) Date of Patent: Dec. 26, 2023

(54) IRRIGATION PUMPJACK

(71) Applicant: Allied H2O, Inc., Edmond, OK (US)

(72) Inventors: Stephen Paul Stewart, Edmond, OK (US); Karl Edward Storm, Edmond, OK (US)

(73) Assignee: Allied H2O, Inc., Edmond, OK (US)

( * ) Notice: Subject to any disclaimer, the term of this patent is extended or adjusted under 35 U.S.C. 154(b) by 644 days.

(21) Appl. No.: 16/937,335

(22) Filed: Jul. 23, 2020

(65) Prior Publication Data
US 2021/0025148 A1 Jan. 28, 2021

Related U.S. Application Data

(60) Provisional application No. 62/938,044, filed on Nov. 20, 2019, provisional application No. 62/879,110, filed on Jul. 26, 2019.

(51) Int. Cl.
| | |
|---|---|
| *F04B 47/02* | (2006.01) |
| *E03B 3/12* | (2006.01) |
| *E03B 5/06* | (2006.01) |
| *F04C 15/00* | (2006.01) |
| *F04B 47/00* | (2006.01) |

(52) U.S. Cl.
CPC .............. *E03B 5/06* (2013.01); *E03B 3/12* (2013.01); *F04B 47/00* (2013.01); *F04B 47/02* (2013.01); *F04C 15/0073* (2013.01)

(58) Field of Classification Search
CPC . E03B 3/12; E03B 5/06; E21B 43/121; F04B 17/05; F04B 17/06; F04B 35/01; F04B 35/06; F04B 47/00; F04B 47/02; F04B 47/022
See application file for complete search history.

(56) References Cited

U.S. PATENT DOCUMENTS

| | | | | |
|---|---|---|---|---|
| 1,779,762 A | * | 10/1930 | Bane | F04B 9/04 74/44 |
| 2,243,117 A | * | 5/1941 | Patterson | F04B 47/02 74/589 |
| 2,668,517 A | | 2/1954 | Craft | |
| 3,026,744 A | * | 3/1962 | Rouse | F16H 37/00 74/625 |
| 4,293,281 A | * | 10/1981 | Lamoreaux | F04B 35/00 417/44.11 |
| 4,416,329 A | * | 11/1983 | Tanner | F04B 47/02 166/72 |

(Continued)

OTHER PUBLICATIONS

Catalog page from Dean Bennett Supply (undated but admitted to be prior art).

(Continued)

*Primary Examiner* — Charles A Fox
*Assistant Examiner* — Gregory T Prather
(74) *Attorney, Agent, or Firm* — McAfee & Taft

(57) ABSTRACT

A pump comprises a frame and a docking platform connected to the frame. A motor is mounted to the docking platform and has a rotatable drive shaft extending therefrom. Roller bearings are mounted to cross beams attached to the frame. A vertically reciprocable slide bar driven is reciprocable through the at least one pair of roller bearings. A pump rod connector is attached to the slide bar and connectable to a pump rod extending into a well.

16 Claims, 12 Drawing Sheets

(56) References Cited

U.S. PATENT DOCUMENTS

| | | | | |
|---|---|---|---|---|
| 4,512,149 | A * | 4/1985 | Weaver | F04B 47/04 91/275 |
| 4,597,562 | A * | 7/1986 | Joyce | G01N 1/12 73/864.31 |
| 4,683,946 | A * | 8/1987 | Jones | E21B 37/02 166/170 |
| 4,712,983 | A * | 12/1987 | Moynihan | F04B 9/02 417/415 |
| 4,788,873 | A * | 12/1988 | Laney | F04B 47/022 254/423 |
| 4,834,620 | A | 5/1989 | Sweeney | |
| 5,222,553 | A | 6/1993 | Temple | |
| 5,411,444 | A | 5/1995 | Nakamura et al. | |
| 5,429,193 | A | 7/1995 | Hegebarth et al. | |
| 5,772,405 | A * | 6/1998 | Eller | F04B 17/06 74/44 |
| 6,210,125 | B1 * | 4/2001 | Eller | F04B 17/06 74/44 |
| 6,260,625 | B1 * | 7/2001 | Phan | E21B 19/004 166/241.6 |
| 7,624,657 | B2 | 12/2009 | Safran et al. | |
| 8,858,380 | B2 | 10/2014 | Ishizuka et al. | |
| 9,933,053 | B2 | 4/2018 | Yoshimura et al. | |
| 10,150,658 | B1 * | 12/2018 | Benson | B66D 1/60 |
| 10,221,935 | B2 | 3/2019 | Kimura | |
| 10,428,628 | B2 | 10/2019 | Markovitch et al. | |
| 11,401,797 | B1 * | 8/2022 | Newman | B60L 1/003 |
| 2002/0050361 | A1 | 5/2002 | Shaw et al. | |
| 2004/0112607 | A1 | 6/2004 | Beckhardt | |
| 2005/0265874 | A1 | 12/2005 | McClain | |
| 2007/0089883 | A1 * | 4/2007 | Patton | E21B 19/22 166/77.2 |
| 2010/0183464 | A1 | 7/2010 | Stewart | |
| 2012/0045347 | A1 * | 2/2012 | Dvorak | F04B 35/06 417/269 |
| 2016/0047205 | A1 * | 2/2016 | Head | E21B 4/006 475/5 |
| 2017/0204846 | A1 | 7/2017 | Robison et al. | |
| 2018/0051688 | A1 * | 2/2018 | Liu | F04B 49/065 |
| 2018/0334891 | A1 | 11/2018 | Markovitch et al. | |
| 2020/0131893 | A1 * | 4/2020 | McCreery | B65H 75/425 |

OTHER PUBLICATIONS

Image of a prior art pumpjack (undated but admitted to be prior art from the 1920's).

Prior Art Pump (undated but admitted to be prior art).

"Flo-Jak Plus-100 Foot Stainless Steel Pump Kit," retrieved on Dec. 10, 2020, from https://www.flojak.com/flojak-plus-100-foot-stainless steel-pump-kit/.

"Installation & Maintenance Manual for the India Mark II Handpump," Edition 2008, Rural Water Supply Network (undated but admitted to be prior art).

"India Mark Handpump Specifications," Rural Water Supply Network (undated but admitted to be prior art).

"Afidev Handpump Specification," Revision May 2007, Rural Water Supply Network (undated but admitted to be prior art).

"Installation and Maintenance Manual for the Afridev Handpump," Revision Feb. 2007, Rural Water Supply Network (undated but admitted to be prior art).

"Implementation Handpump Technology India Mark II," retrieved on Dec. 10, 2020, from https://www.rural-water-supply.net/en/implementation/public-domain-handpumps/India-mark-ii.

"Implementation Handpump Technology Bush Pump," Rural Water Supply Network, retrieved on Dec. 10, 2020, from https://www.rural-water-supply.net/en/implementation/public-domain-handpumps/bush-pump.

"Implementation Handpump Technology Afridev," Rural Water Supply Network, retrieved on Dec. 10, 2020, from https://www.rural-water-supply.net/en/implementation/public-domain-handpumps/afridev.

International Search Report and Written Opinion dated Dec. 9, 2020, in corresponding PCT Application No. PCT/US2020/043317.

* cited by examiner

IRRIGATION PUMPJACK

BACKGROUND

The vast majority of smallholder farmers in developing nations face an economic barrier that prevents them from irrigating crops during the dry season because water is just beyond the reach of affordable suction pumps. At least 10 million smallholder farmers in sub-Saharan Africa live over subterranean water that is sufficient to irrigate crops but is at a depth beyond the reach of suction pumps. Lift pumps that can raise water from the needed depths either require too much manual effort, fail to raise sufficient quantities of water, or are prohibitively expensive relative to the economic return that the pump can help generate. Pump systems that can economically and efficiently raise water from intermediate-depth aquifers (25 to 75 feet), at sufficiently low purchase price and operating cost are needed.

DESCRIPTION OF AN EMBODIMENT

Figure 1:
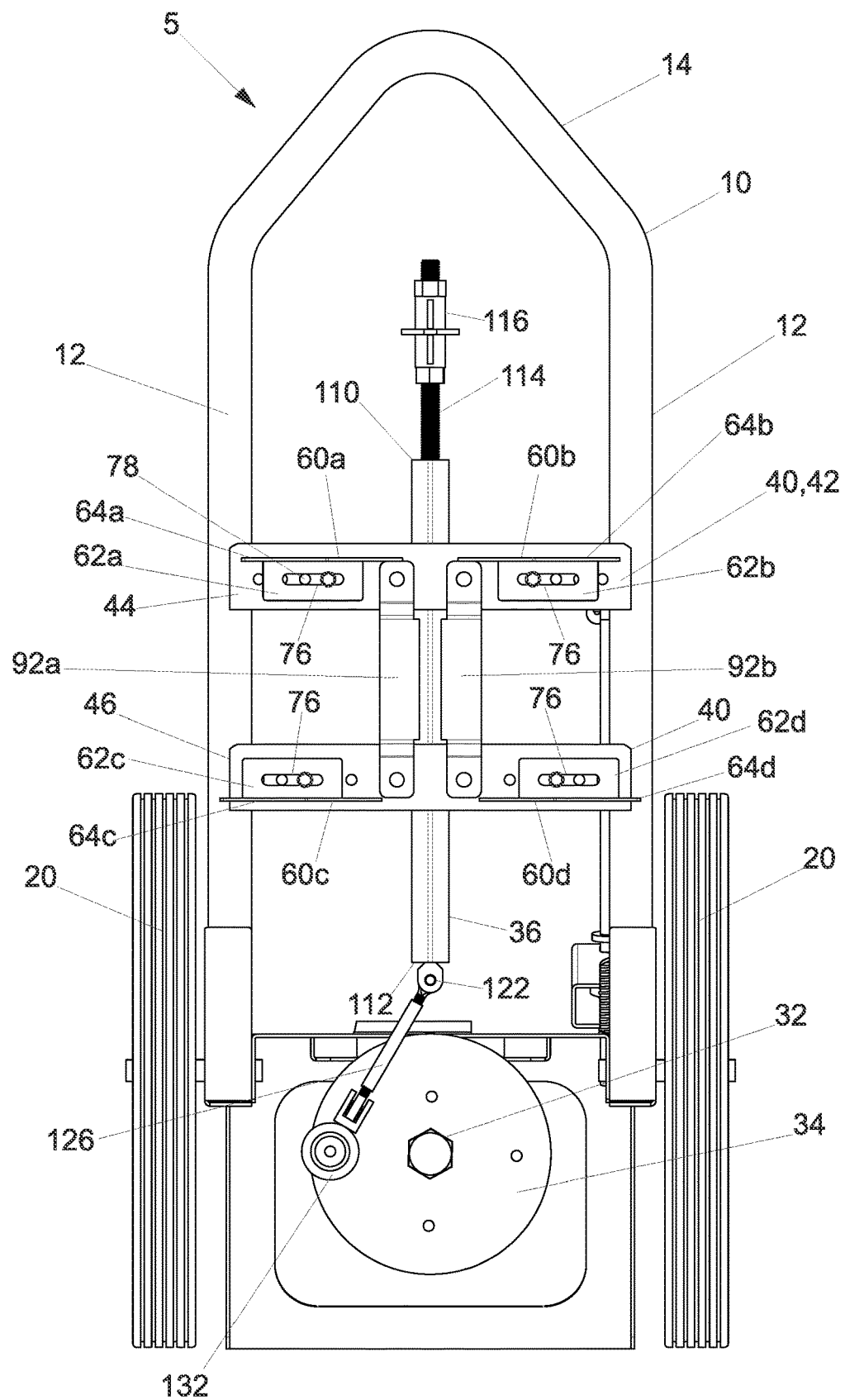
FIG. 1 shows back view (wellhead) elevation of a complete pumpjack frame.
Figure 2:
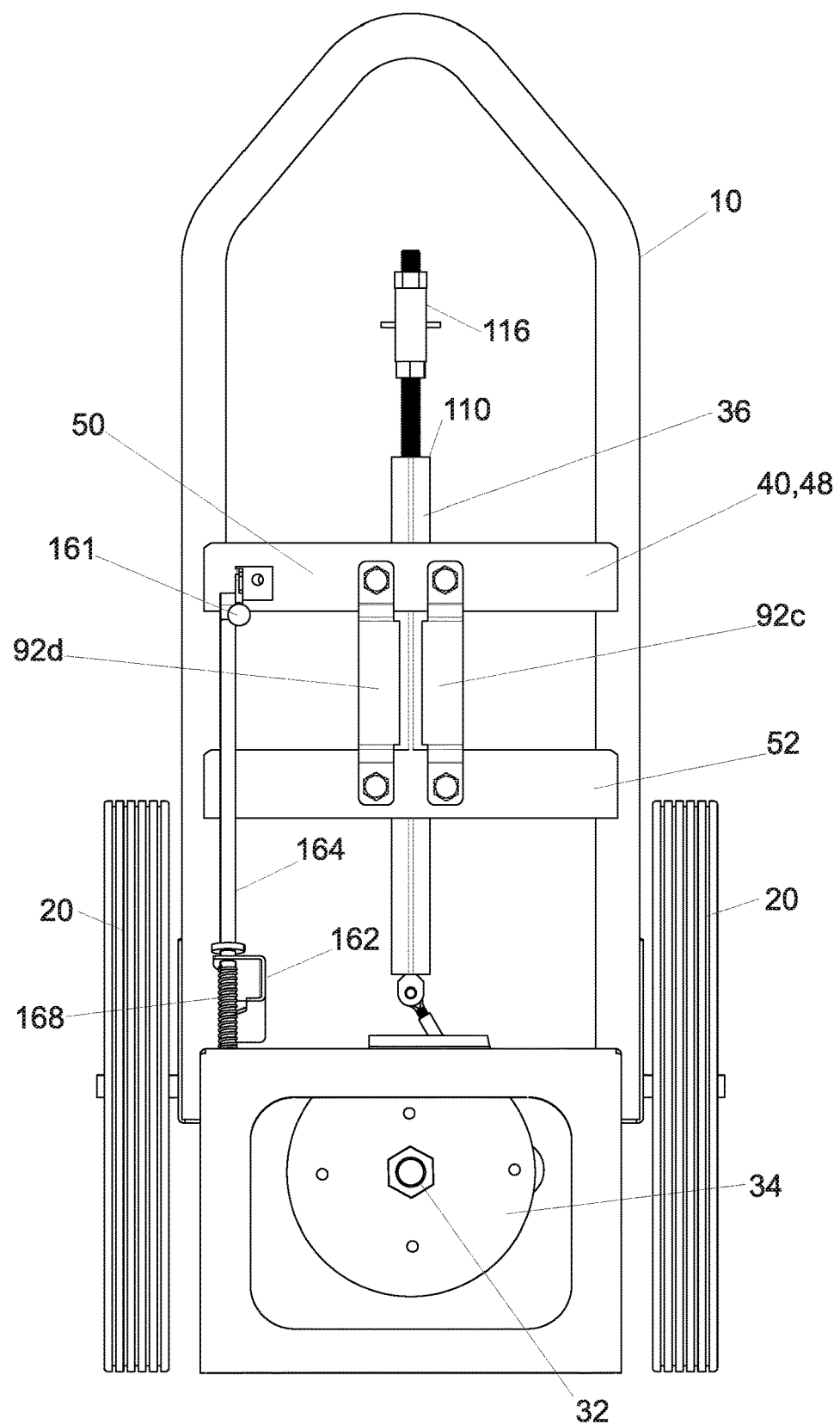
FIG. 2 shows front view (dock) elevation of a pumpjack frame.

The mechanical pumpjack disclosed is capable of reciprocating the pump rod strings of lift-pump cylinders and plunger pumps installed in intermediate-depth aquifers (for example 25 feet to 75 feet), to supply significant amounts of water equal to or greater than 3,000 gallons per day while being constructed from affordable components with material costs as low as $300. The pumpjack is a mobile pumpjack with wheels, and may easily be moved from site to site simply by pulling on the handle provided and moving the pumpjack over the ground surface. Additionally, the current disclosure is able to connect to and operate the most common international manual water pump designs giving international relief organizations and local governments in underserved areas the ability to better utilize and modernize previous investments in borehole construction and manual water pump installations. The current disclosure could be combined with a simple chlorination system and a slightly raised water storage tank to be an exceptionally economical way to mechanize the raising of potable water from existing water-well locations. The pumpjack provides an economically viable way for smallholder livestock and crop farmers located over water supplies between 25 and 75 feet below ground to benefit from agriculturally significant amounts of water for irrigation. The mechanical power source can be selected from known power sources and may be for example a 4 stroke gasoline engine. With the addition of an alternator, the 4 stroke engine can offer potential additional electrical outputs; (a) augmenting power for a predominantly solar-powered irrigation system during times of reduced sunlight; (b) powering an electric suction pump if surface water is intermittently available; (c) supply electricity for lighting or recharging batteries.

The versatility of the pumpjack disclosed herein is evidenced from the range of fuel or energy that it can utilize for operation. The mechanical power dock can accept a variety of high speed, low torque rotational power inputs. The power source can be mechanically connected to a first auxiliary input shaft that extends from a gear box with a speed reducing gear arrangement therein. The auxiliary input shaft can accept a medium speed and medium torque rotational power input. The first auxiliary input shaft can be operated as an auxiliary output shaft to power small agricultural equipment like grain dryers, seed separator and cleaners, grinding mills, etc. The gearbox has a direct input/gearbox output shaft that can accept a low speed, high torque rotational power input. Through these arrangements, external drive shafts from small machinery, manual hand crank, or other such available power sources as steam power or animal traction may be used to power the embodiment. The pumpjack is mobile and includes a detachable mechanical power source which operates below-ground water raising components, for example a cylinder, rising main, and pump rod.

The pumpjack disclosed herein has a cantilevered reciprocation ability, and as a result can mechanize manual water pump locations by securing, for example, a DC electric powered pumpjack to the wellhead supplied by solar energy or a 4 stroke engine located 30 feet away (conforming to potable water regulations). This conversion can eliminate manual effort in raising the water and shorten queues by increasing the yield. The yield can be increased significantly, and in some cases for example from 4 to 15 gallons per minute depending on pump cylinder design, power source size, well piping diameters and depth to water.

The current disclosure can reciprocate pump rods operating through the increased restriction of stuffing box designs which utilize gland seals in order to build pressure in the discharged water for elevating into holding tanks for drip irrigation or direct operation of sprinklers. Equal force being applied throughout the stroke cycle provides the opportunity for a double-action cylinder design to significantly increase flow rate and reduce operational costs. Controlling the rate of travel for both portions of the stroke cycle precludes the maximum cycle speed from being determined by the natural gravitational fall of the pump rod string and plunger valve assembly thus increasing the cycle speed and subsequent gallon per minute capacity of the current disclosure.

Figure 3:
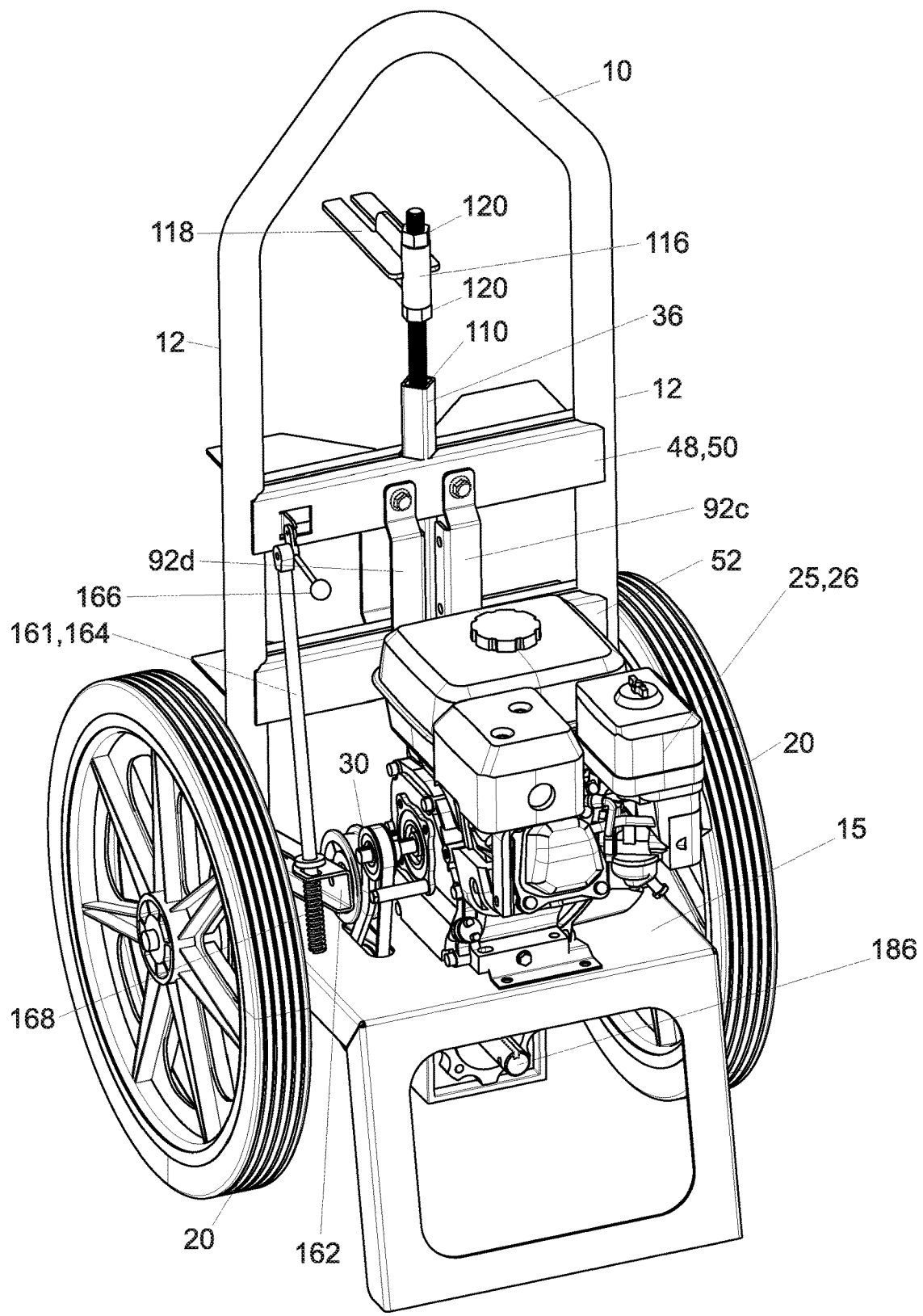
FIG. 3 shows a construction of a pumpjack with 4 stroke engine.
Figure 4:
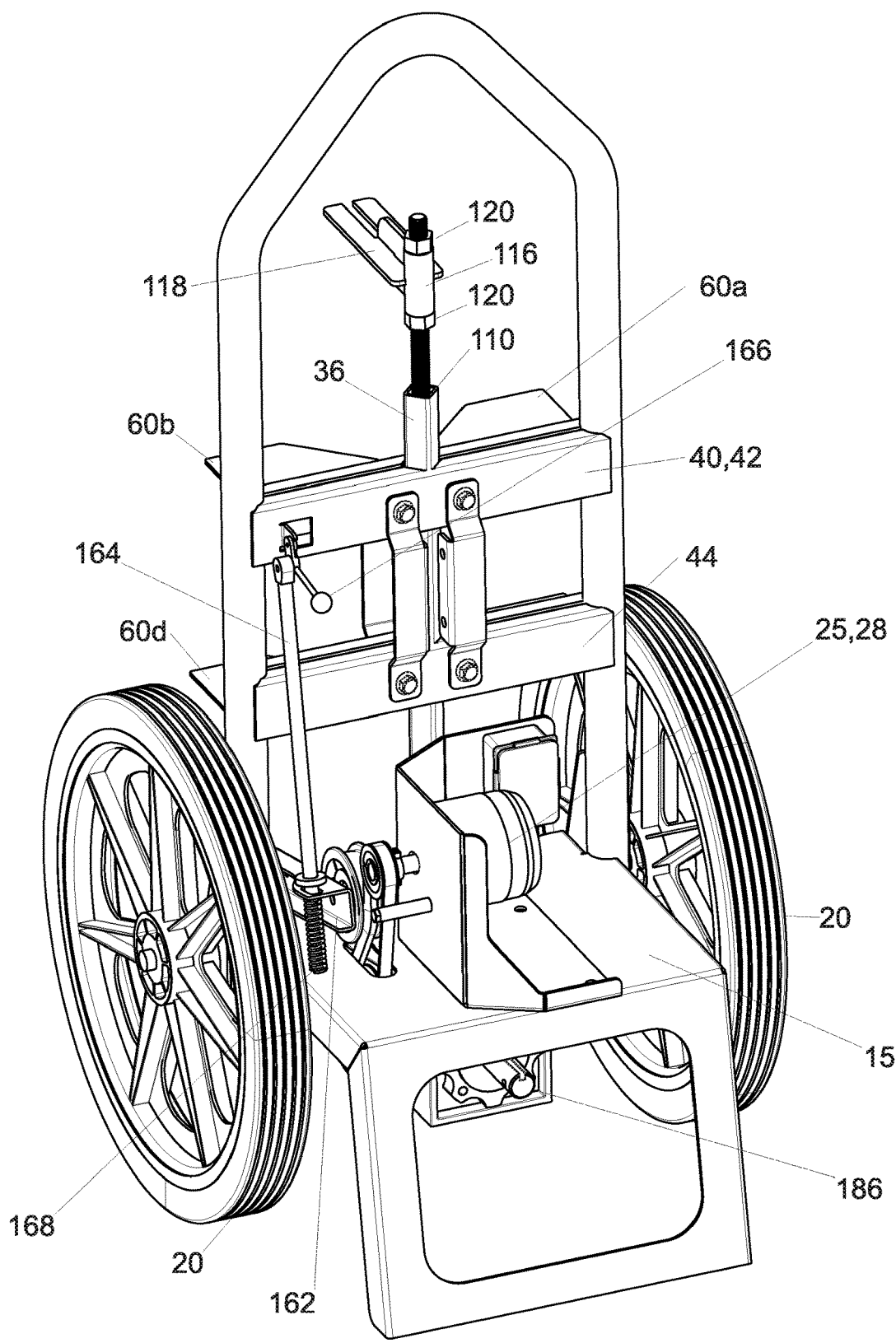
FIG. 4 shows a construction of a pumpjack with DC motor.
Figure 5:
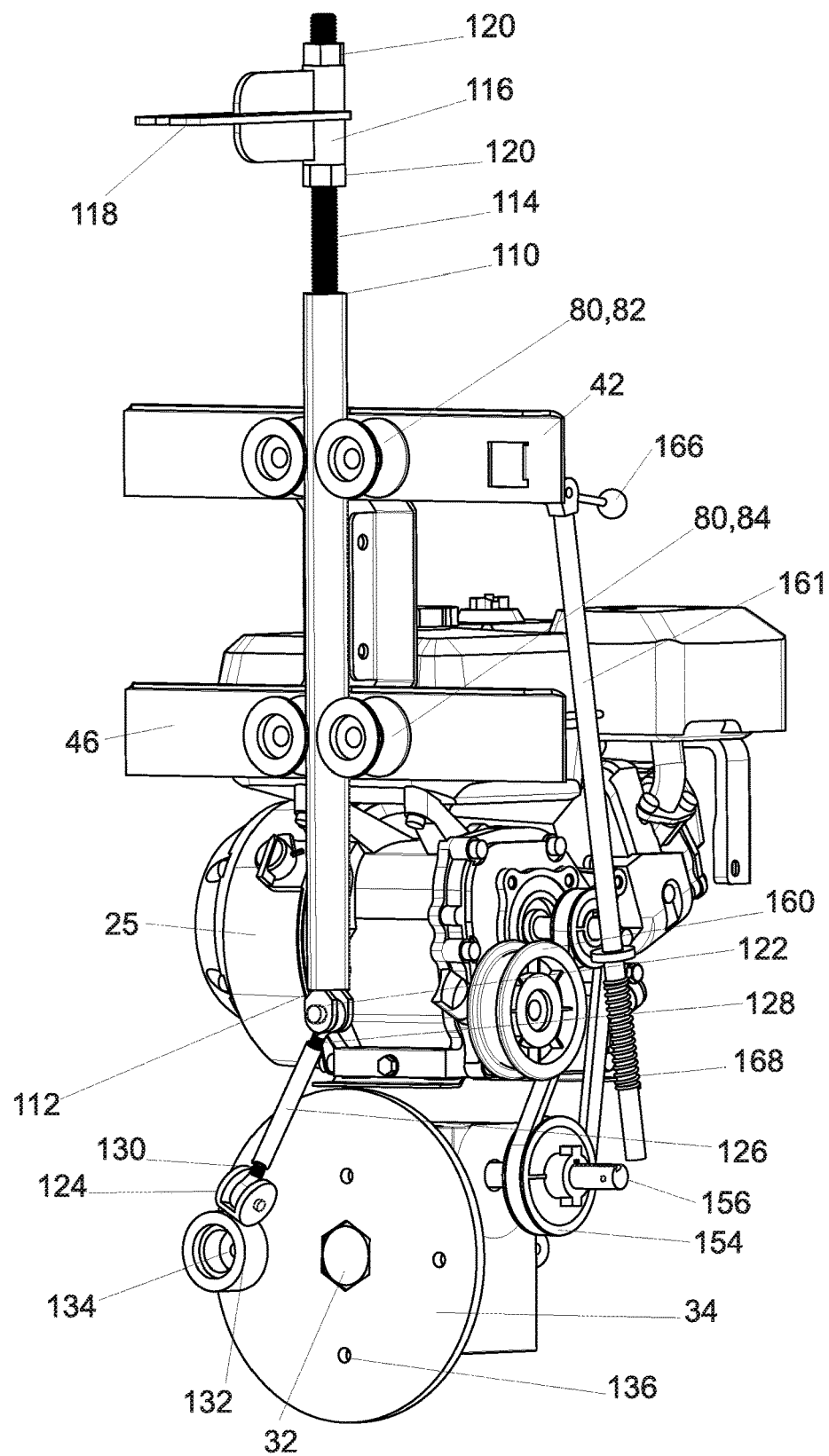
FIG. 5 shows a back perspective view of a partial construction of the pumpjack components.
Figure 6:
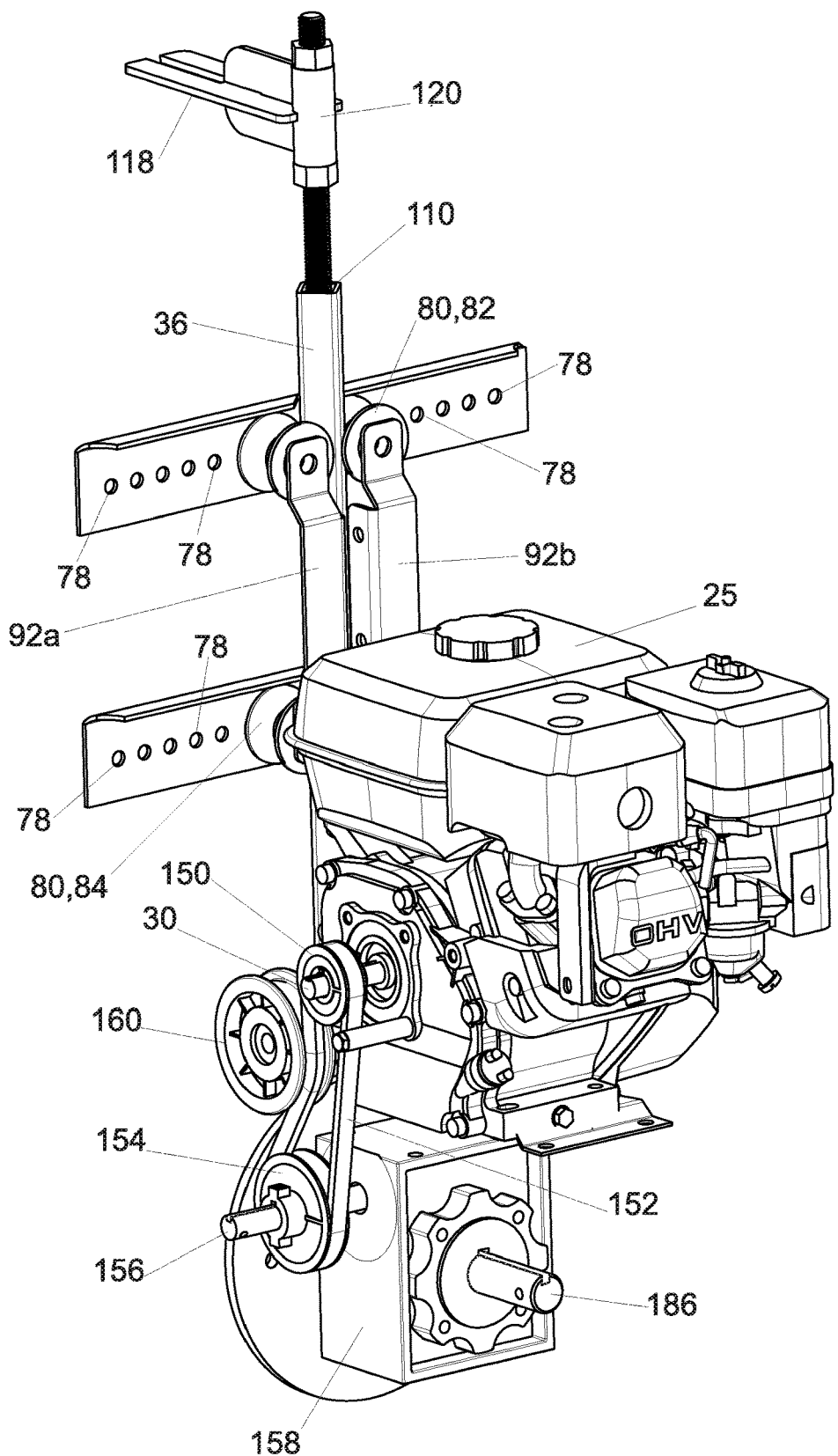
FIG. 6 shows a front perspective view of a partial construction of the pumpjack components.
Figure 7:
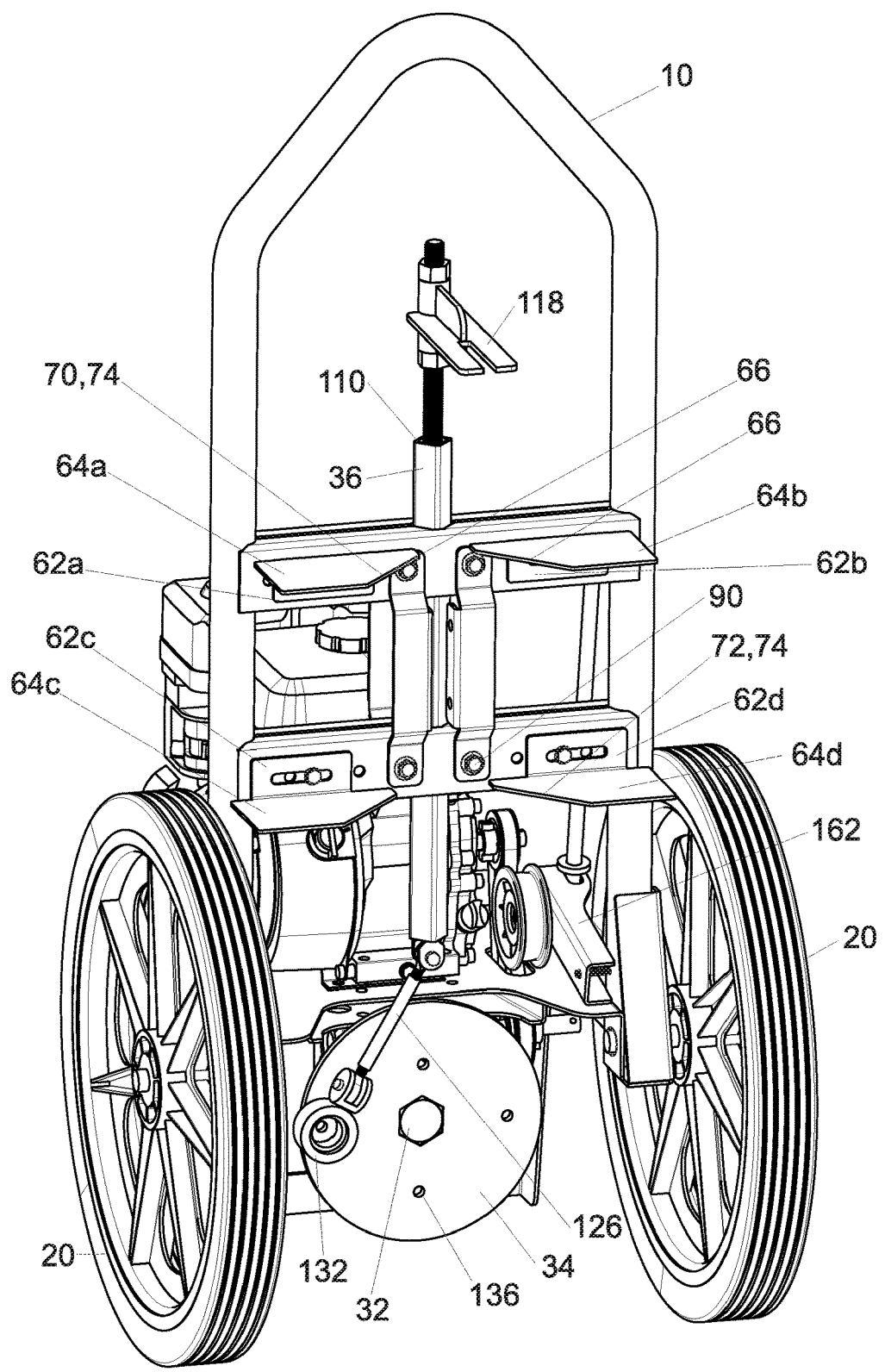
FIG. 7 shows a back perspective view of a construction of a pumpjack.

Referring now to the figures, a well pump, or pumpjack 5 comprises a framework 10. Frame 10 comprises upstanding legs 12 and a handle 14 connecting the upstanding legs 12 at the upper ends thereof. A mechanical power dock, which may also be referred to as a docking platform 15 is mounted to frame 10. Wheels 20 are mounted to frame 10, so that pumpjack 5 is a mobile pumpjack capable of easy relocation from one well to another. The pumpjack 5 can be moved simply by grasping handle 14 and pushing or pulling the pumpjack over the ground surface. A power supply 25 is mounted to platform 15. Power supply 25 provides the rotational input power required to operate the pumpjack 5. Power supply 25 can be, in non-limiting examples, motors such as a liquid fuel engine (4 stroke or 2 stroke, gasoline, diesel, biofuel), or vapor fuel engine (natural gas, propane, or biomass), or an electric motor (AC motor from grid or local generator, or DC motor from PV panel or battery or generated DC power). FIGS. 3 and 4 show gas powered engine 26 and a DC electric motor 28 respectively. Examples of suitable gas and electric powered motors include a four stroke 79 cc engine and 750 W DC motor respectively. Mechanical power dock 15 is positioned to locate the power supply 25 in the correct position and alignment to provide input rotational power.

A drive shaft 30 extends from the power supply 25, and as detailed herein is operable to rotate a disk 34. Disk 34 is connected to a slide bar 36. Rotation of disk 35 will reciprocate slide bar 36. Slide bar 36 will be connected to a pump rod and will reciprocate the pump rod resulting in the reciprocation of a pump rod string in the well. As a result of the configuration of the pumpjack 5, it can easily be connected to wells that had previously been manually operated to generate increased production with less manual labor.

Frame 10 includes a plurality of cross members 40. Cross members 40 include well side cross members 42 and dock side cross members 48. The dock side is the front side and the well side is the rear side. Well side cross members include vertically spaced upper, or first well side cross member 44 and lower, or second well side cross member 46. Dock side cross members 48 include vertically spaced upper, or first dock side cross member 50 and lower, or second dock side cross member 52. Cross members 40 are welded or otherwise connected to upstanding legs 12. Adjustable securement brackets 60 are affixed to the well side cross members 44 and 46. Adjustable brackets 60 are angle brackets with a leg 62 connected to the cross members and an outwardly extending flange 64. Flanges 64 extend outwardly in the transverse direction, and have an inner edge 66 that is angled so that opposed adjustable securement brackets 60 define a V-shaped notch 68. There are two V-shaped notches in the described embodiment, an upper notch 70 and lower notch 72. The brackets 60 have been identified as brackets 60 *a, b, c* and *d* for identification purposes, but it is understood that the brackets 60*a*-60*d* are in one embodiment symmetrical pairs. Notches 68 define an engagement surface 74 that is an engagement surface for engaging a wellhead of a well as disclosed herein.

The brackets 60 are vertically adjustable, in that the flanges 64 can be vertically repositioned simply by inverting the bracket and moving to the opposite side. For example bracket 60*a* would be inverted and placed in the position of 60*b*, and 60*b* inverted and positioned in the location shown for 60*a*. The flanges 64 are repositioned vertically downwardly from the position shown in the drawings. The same can be performed for brackets 60*c* and 60*d*. Bracket 60*c* can be inverted and positioned where bracket 60*d* is shown and 60*d* inverted and positioned where 60*c* is currently shown. The flanges 64 are repositioned and moved vertically upwardly from the position shown in the figures. The brackets 60 thus provide for an easy vertical adjustment if necessary for clearance and to prevent interference with equipment at the wellhead.

Figure 8:
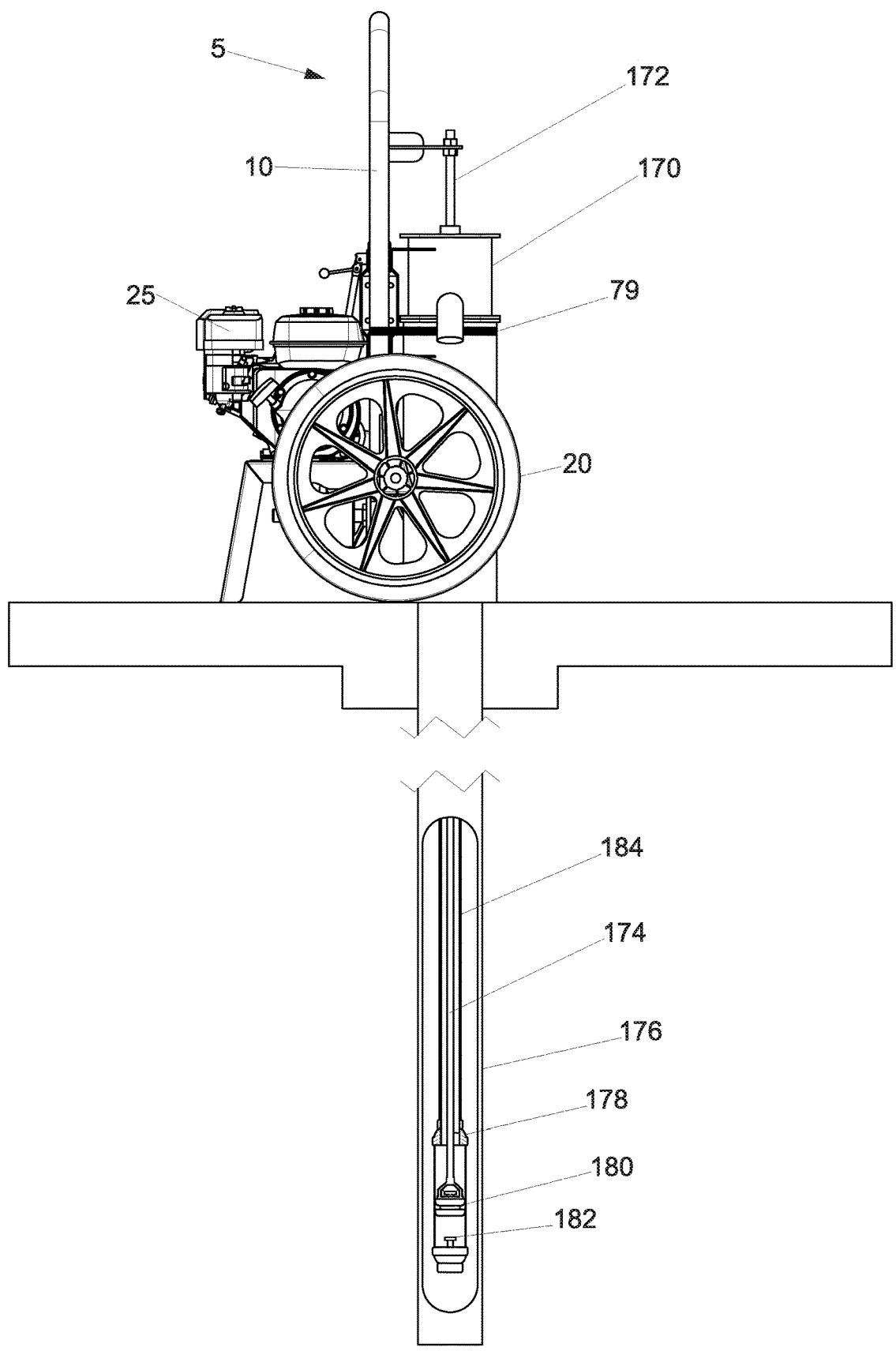
FIG. 8 shows a typical installation of the pumpjack.
Figure 9:
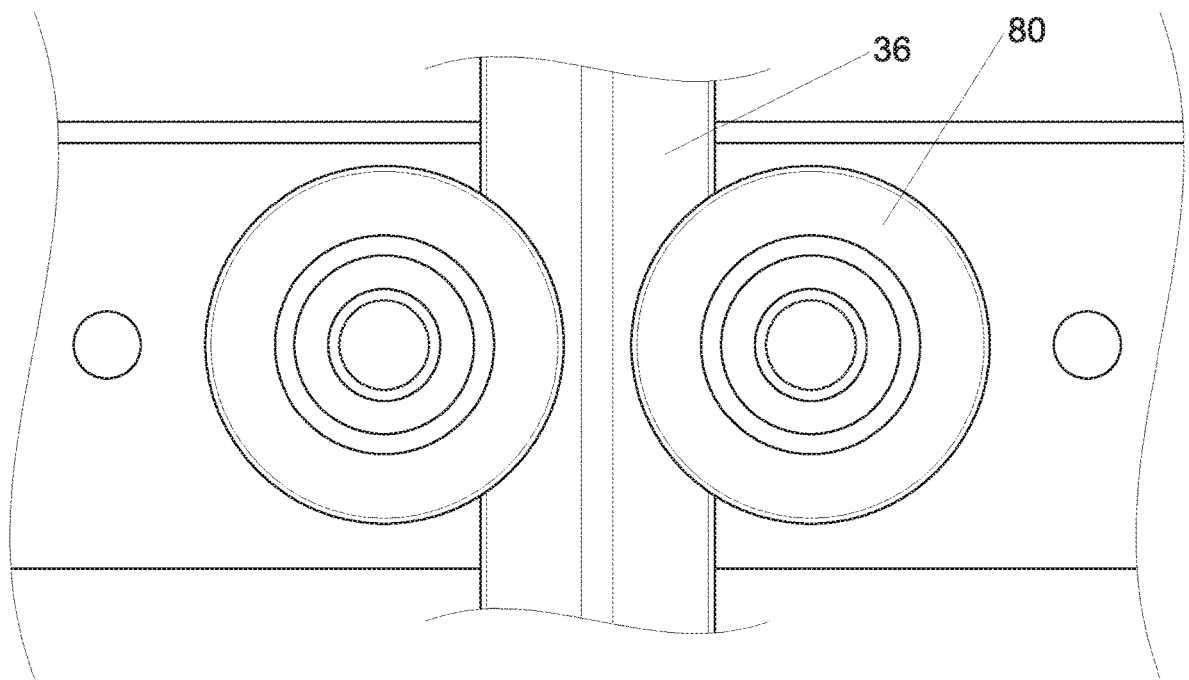
FIG. 9 is a front view partial construction of the slide bar engaged by roller bearings.
Figure 10:
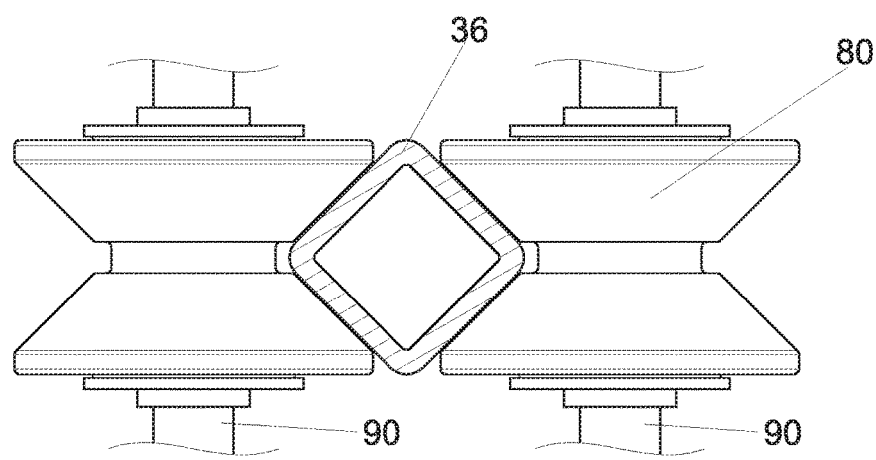
FIG. 10 is a top view cross section of the slide bar engaged by roller bearings.
Figure 12:
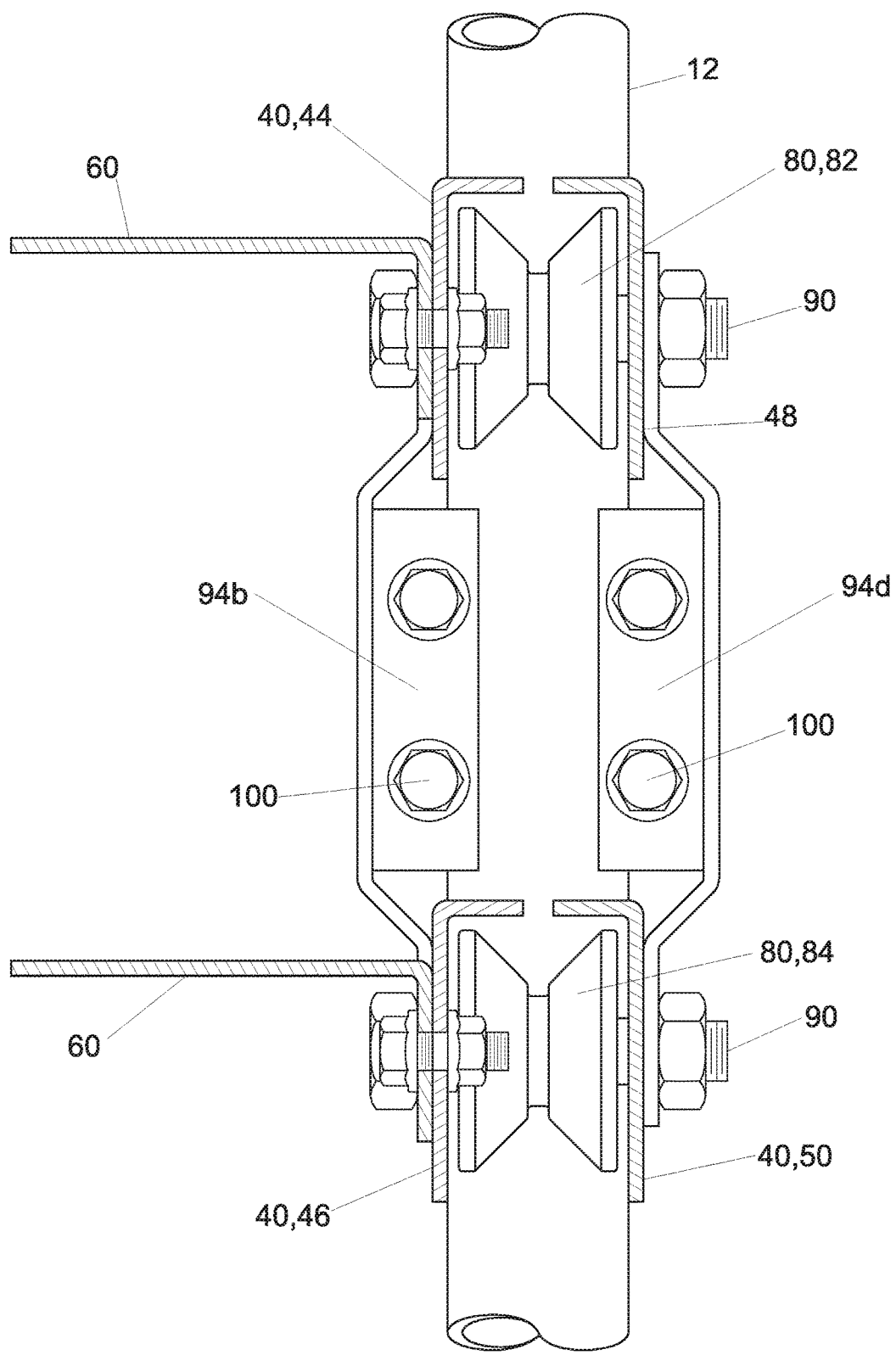
FIG. 12 is a cross section from line 12-12 of FIG. 11.
Figure 13:
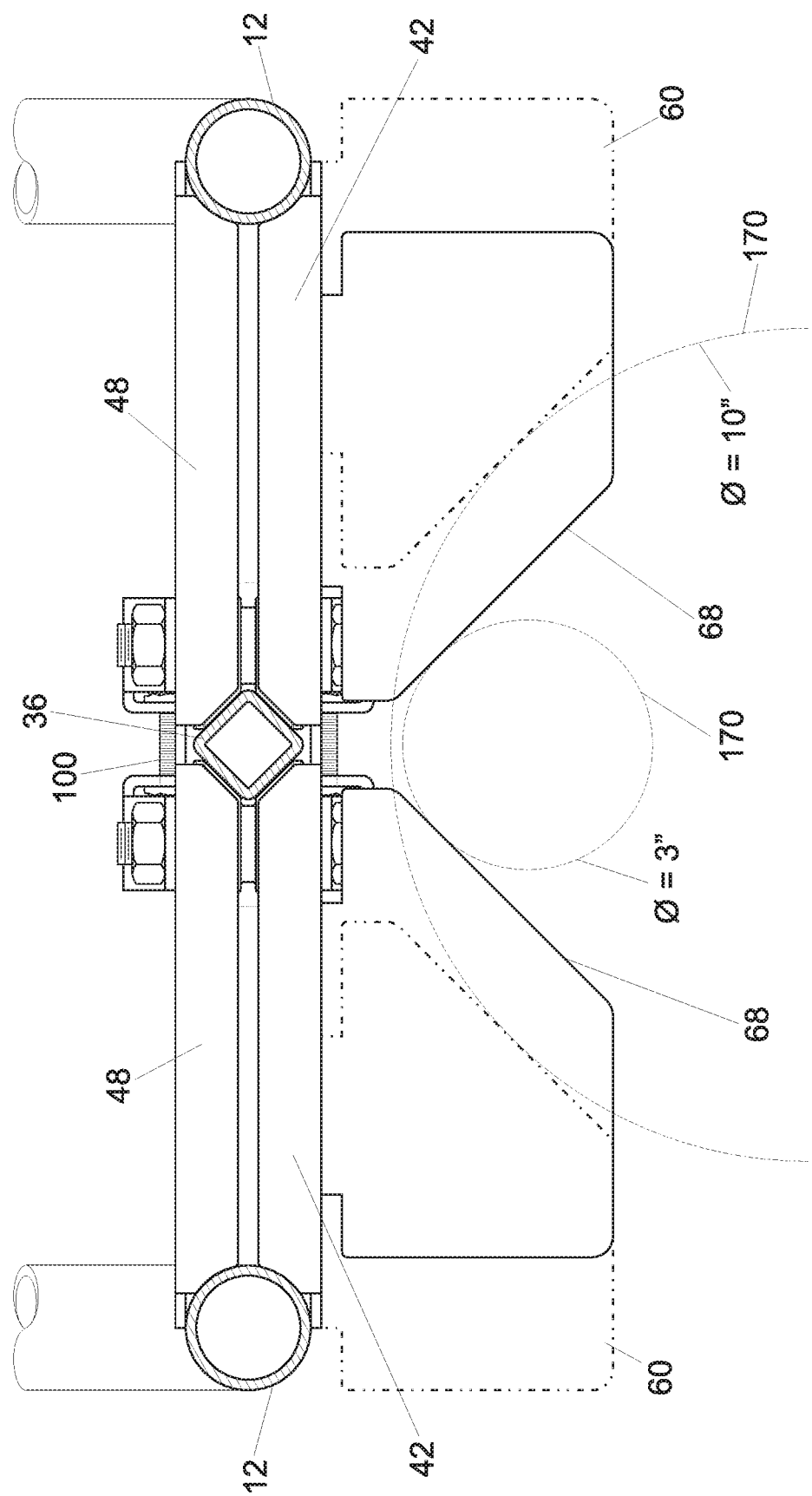
FIG. 13 is a view looking down at the adjustable brackets attached to the frame of the pumpjack.

The securement brackets 60 are also laterally adjustable. Legs 62 have slots 76 therein. Well side cross members 42 have a plurality of fastener holes 78 therein. Brackets 60 can move laterally inwardly and outwardly, and be connected with fasteners extending thorough holes 78 and slots 76. It is known that the wellhead casing that is above ground can vary greatly in diameter. Because brackets 60 are laterally adjustable, the pumpjack 5 can be utilized at locations with varying wellhead casing sizes. In one embodiment, the V-shaped notches 68 will engage wellhead casings ranging from three inches in diameter to ten inches in diameter by moving the adjustable brackets only approximately 1.625 inches. As depicted in FIG. 8, a tension strap 79 is placed around the wellhead casing and the notches 68 engage the wellhead casing to securely hold the pumpjack 5 in place during operation. Examples of the varying sizes of wellhead casings are shown in dashed lines in FIG. 12.

The reciprocating motion of the slide bar 36 is constrained to linear action by roller bearings 80 mounted to cross members 40. Roller bearings 80 are positioned between well side and dock side cross members 42 and 48 respectively. In one embodiment slide bar 36 is a generally square shaped slide bar, and the roller bearings are V-shaped roller bearings. Roller bearings 80 comprise an upper, or first pair of roller bearings 82 and a lower, or second pair of roller bearings 84. Roller bearings 82 and 84 are generally identical and are mounted such as to capture the square slide bar 36 and bear equally on each face. Roller bearings 80 are mounted to cross members 40. Specifically upper roller bearings 82 are mounted to upper well side and dock side cross members 44 and 50 and lower roller bearings 84 are mounted to lower well side and dock side cross members 46 and 52. Roller bearings 80 will rotate about an axle bolt 90 that extends through the well side and dock side cross members 42 and 48.

Figure 11:
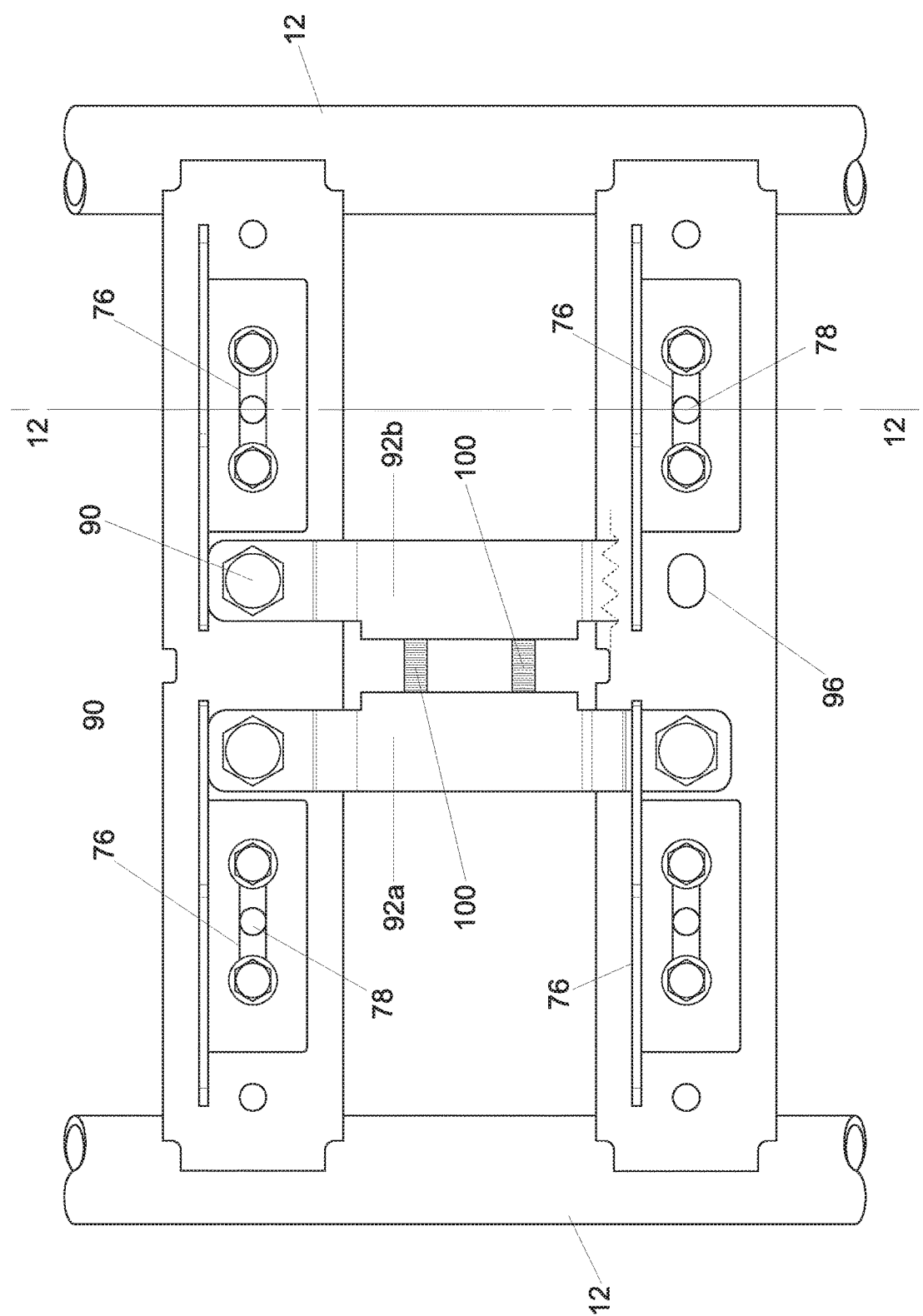
FIG. 11 is a view from the back, or well side of the pumpjack.

Tensioning brackets 92 may be utilized to provide a lateral adjustment to the roller bearings 80. Tensioning brackets 92 have flanges 94 that extend inwardly toward each other in a transverse direction. Tensioning brackets 92 include subscripts a-d. Tensioning brackets thus include opposed well side tensioning brackets 92*a* and 92*b* and opposed dock side tensioning brackets 92*c* and 92*d*. Bolts 100 extend through openings in the flanges 94 on all of tensioning brackets 92*a*-92*d*. The tightening/loosening of the bolts 100 will laterally adjust the position of roller bearings 80. In other words, bolts 100 connect the flanges 94*a* and 94*b* on the well side tensioning brackets and flanges 94*c* and 94*d* on the dock side tensioning brackets. The lateral adjustment is accomplished by providing a slotted opening in the cross members 40 through which axle bolts 90 extend. The slotted openings will be provided on only one side. For example, slotted openings 96 may be provided through well side and dock side cross members 42 and 48 to attach the tensioning brackets 92*b* and 92*d*, which are placed directly across from one another. FIG. 11 is a view with a portion of the tensioning brackets 92 not shown so that slots 96 are visible. The slots allow the tensioning brackets 92*b* and 92*d* and the corresponding roller bearings to move laterally. In this way, a lateral adjustment is provided to account for any wear on the slide bar 36 or the roller bearings 80. The adjustment range is slight, and is primarily to provide for wear and certainty of secure engagement of the roller bearings 80 to slide bar 36.

Slide bar 36 has upper end 110 and lower end 112. A threaded rod 114 extends upwardly from upper end 110. A threaded coupling 116 is threaded to rod 114 and a pump rod connector 118 extends outwardly therefrom for connection to a pump rod as explained herein. Lock nuts 120 may be used to hold coupling 116 in place on threaded rod 114. Lower end 112 is connected to crank disk 34. Crank disk 34 is rotated which causes the vertical reciprocation of slide bar 36. A slide bar yoke 122 is connected to lower end 112 of slide bar 36 and to a first end 128 of a connecting rod 126. A second end 130 of connecting rod 126 is connected to a yoke 124 that is in turn connected to a gimballed crank strap 132. Gimballed crank strap 132 is connected to crank disk 34 with a pin 134. Crank disk 34 includes a plurality of openings 136 through which pin 134 may connect crank strap 132. The openings 136 are positioned radially outwardly at different lengths from the center of crank disk 34, which provides for different stroke lengths of slide bar 36.

Power supply 25 may be, as noted earlier, any number of known power supplies. FIG. 3 shows a gas powered motor 26 while FIG. 4 shows a DC motor 28. In either case drive shaft 30 will extend therefrom to provide the motive power to operate pumpjack 5. A drive pulley 150 is fixed to drive shaft 30 and rotates therewith. A drive belt 152 engages drive pulley 150 and a driven pulley 154 that is fixed to gear shaft 156. Gear shaft 156 extends from speed reducing gear box 158. Speed reducing gear box 158 houses a gear arrangement which is a speed reducing gear arrangement that may be for example, a worm gear arrangement. Gear shaft 156 is also a first auxiliary input shaft 156.

An idler pulley 160 is mounted to a bracket 162 that is pivotally mounted to frame 10. A clutch 161 includes a shaft 164 that extends from a pivotally mounted clutch lever 166 through an opening in bracket 162 and through platform 15. A clutch spring 168 is positioned between bracket 162 and platform 15. Clutch lever 166 is movable from an up, or disengaged position, to a down, or engaged position. In the disengaged position of the clutch, idler pulley 160 is in a first position in which it does not tension drive belt 152. In the engaged position of the clutch, idler pulley 160 is in a second position in which idler pulley 160 engages and tensions drive belt 152 so that driven pulley 154 is rotated thereby rotating gear shaft 156. Driven pulley 154 has a greater diameter than drive pulley 150, which provides for a speed reduction from drive shaft 30 to gear shaft 156. In the disengaged position of the clutch 161, drive belt 152 is loose and not tightly engaged with driven pulley 154. As a result first auxiliary input shaft 156 may be rotated by a separate power source. When clutch 161 is in the disengaged position, first auxiliary input shaft 156 may be connected directly to a separate power source with a medium speed and medium torque rotational power input, such as a portable drill motor. Output shaft 32 extends from gearbox 158 and is fixed to crank disk 34.

In operation, pumpjack 5 is moved to a desired well location. Adjustable brackets 60 are positioned so that a wellhead 170 is engaged by the engagement surface defined by V-shaped notches 70 and 72. Tension strap 79 is placed around wellhead 170 and holds pumpjack 5 stable against the wellhead 170. Connector 118 is connected to pump rod 172 which is connected to pump rod string 174. The well described herein is typical, and it is understood that other downhole arrangements exist to which the pumpjack can be connected. A casing 176 may be placed in the well. Rod string 174 is reciprocable in a rising main 184. A pump cylinder 178 is located at a lower end of rising main 184. A traveling valve 180 and foot valve 182 are positioned in the well below pump cylinder 178. Gimballed crank strap 132 is connected to the appropriate opening 138 that provides the desired stroke length.

Pumpjack 5 is then operated by actuating power supply 25 which rotates drive shaft 30. Clutch 161 is engaged, so that drive pulley 150 rotates driven pulley 154, which causes rotation of output shaft 32. Crank disk 34 rotates reciprocating slide bar 36 which causes pump rod string 174 to reciprocate and pump fluid, such as water, from the well. The speed reducer comprises the driven pulley 154 and speed reducing gearbox 158 with speed reducing gear arrangement therein. Thus, for example the rotational speed of drive shaft 30 may be reduced by a 4 to 1 ratio by driven pulley 154, and further reduced by gearbox 158 a ratio of 10 to 1 so that an overall reduction of 40 to 1 is obtained. If desired, clutch 161 can be disengaged, and gear shaft 156 used as an auxiliary input shaft that is directly connected to a power source as described above. When clutch 161 is engaged and driven pulley 154 is rotated by drive belt 152, auxiliary equipment may also be operated by utilizing shaft 156 as an output shaft to power the auxiliary equipment, such as for example small agricultural equipment like grain dryers, seed separator and cleaners, grinding mills and other equipment. A second auxiliary input shaft 186 extends toward the dock side of pumpjack 5 and is directly connected to output shaft 32. A power source can be directly connected to second auxiliary input shaft 186 to rotate output shaft 32. For example, when clutch 161 is disengaged, input shaft 186 may be freely rotated manually, or with a power source separate from the pumpjack 5. The provision of multiple drive/input shafts provides for use of different power sources, including simply manually operating by manually rotating second auxiliary input shaft 186.

The current disclosure can be driven by a range of energy options whether standing alone or utilizing an optimized combination of sources to meet the particular needs of smallholders. Those options include Direct-drive; 4 stroke engine for on-demand operation of pumpjack and lowest entry capital cost.

Direct-drive; DC electric motor being powered by 4 stroke engine with alternator providing direct current for on-demand operation of pumpjack for times of insufficient solar availability or proximity restrictions for internal combustion engines operating potable water pumps.

Direct-drive; PV solar panels providing direct current to DC electric motor for lowest operating cost of pumpjack.

Direct-drive; DC electric motor powered by grid electricity passed through a rectifier and transformer providing current for on-demand operation for lowest capital cost for electric system.

Indirect-drive; 4 stroke engine with alternator to battery to DC motor for most consistent engine load allowing batteries to take fluctuations in power demand from reciprocation resulting in lowest operating cost for a fuel powered system.

Indirect-drive; PV solar panels to battery to DC motor for momentary disruption from cloud cover and to maximize use of daily solar radiation.

Augmented-drive; PV solar panels providing direct current to DC electric motor with 4 stroke engine with alternator providing as-needed current to combine low operating cost while maintaining an irrigation threshold.

Augmented-drive; PV solar panels providing direct current to DC electric motor with grid supplied electricity passed through a rectifier and transformer for lowest operating cost with an irrigation threshold. Operating costs could be further reduced with the inclusion of batteries in these systems.

Embodiments disclosed herein include:

Embodiment A. A pump comprising a frame, a docking platform connected to the frame, and a motor mounted to the docking platform. The motor has a rotatable drive shaft extending therefrom. A plurality of cross beams are connected to the frame and at least one pair of roller bearings are mounted to the cross beams. A vertically reciprocable slide bar is driven by rotation of the rotatable shaft and reciprocable through the at least one pair of roller bearings and a pump rod connector is attached to the slide bar and connectable to a pump rod extending into a well.

Embodiment B. A well pump comprising a frame, the frame having a pair of spaced-apart upstanding legs. First well side cross member and first dock side cross member are connected to and extend between the upstanding legs, and a slide bar is mounted to the cross members and is vertically reciprocable thereto. A motor is configured to vertically reciprocate the slide bar, and a securing band is configured to secure the well pump against a wellhead. A first pair of laterally spaced securement brackets are connected to the first well side cross member and has flanges extending transversely therefrom, the flanges defining a truncated V-shaped engagement surface positioned to engage the wellhead.

Embodiment C. A well pump comprising a frame, a support platform mounted to the frame, a slide bar reciprocably mounted to the frame, a rotatable disk connected to the slide bar, and an output shaft fixed to the rotatable disk such that rotation of the output shaft rotates the rotatable disk. Embodiment C further includes a drive shaft having a drive pulley fixed thereto, a gear shaft with a driven pulley fixed thereto, the gear shaft extending from a speed reducing gearbox, the gearbox having an output shaft extending therefrom, a drive belt connecting the drive pulley and driven pulley, a second auxiliary input shaft extending from the gearbox in a direction opposite the output shaft and connected to the output shaft, each of the drive shaft, the gear shaft and second auxiliary input shafts being independently connectable to a power source and operable as an input shaft to rotate the output shaft at different speeds.

To the extent not already included, embodiments A, B and C may have one or more of the following additional elements in any combination Wheels connected to the frame.

Securement brackets mounted to the cross beams to engage a wellhead.

A speed reducing arrangement coupled to the drive shaft.

A clutch movable from an engaged to a disengaged position. The clutch in the engaged position moving the idler pulley to a second position in which tension is applied to a drive belt to operably connect the drive pulley with the driven pulley, such that the drive pulley rotates the driven pulley.

A securing band for securing the well pump to a wellhead.

A pump rod connector connected to a pump rod to reciprocate the pump rod as the slide bar reciprocates.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention.

What is claimed is:

1. A pump comprising:
   a frame;
   a docking platform connected to the frame;
   a motor mounted to the docking platform, the motor having a rotatable drive shaft extending therefrom;
   a plurality of cross beams connected to the frame;
   at least one pair of roller bearings mounted to the cross beams;
   a vertically reciprocable slide bar driven by rotation of the rotatable drive shaft and reciprocable through the at least one pair of roller bearings;
   a pump rod connector attached to the slide bar and connectable to a pump rod extending into a well;
   a speed reduction arrangement coupled to the drive shaft, the speed reduction arrangement comprising;
      a drive pulley fixed to the rotatable drive shaft;
      a gearbox containing a speed reducing gear arrangement;
      a gear shaft extending from the gearbox and connected to the gear arrangement;
      a driven pulley fixed to the gear shaft; and
      a drive belt engageable with the drive shaft and the gear shaft;
   an output shaft rotated by the drive shaft at a rotational speed less than the rotational speed of the drive shaft;
   a disk coupled to the output shaft and rotatable therewith, the disk being connected to the sliding bar such that rotation of the disk vertically reciprocates the slide bar; and
   an idler pulley movable between a first position and a second position, wherein in the second position the idler pulley tensions the drive belt so that the rotation of the drive shaft rotates the gear shaft, and in the first position the drive belt is loose and the gear shaft may be used as an auxiliary input shaft for connection to an auxiliary input source.

2. The pump of claim 1, the frame comprising a mobile frame having wheels connected thereto.

3. The pump of claim 1 further comprising at least one pair of opposed brackets extending forward from the frame, the brackets defining a generally V-shaped notch configured to engage a portion of a wellhead at a well at which the pump is located.

4. The pump of claim 1 further comprising a clutch operable to move the idler pulley between its first and second positions.

5. A well pump comprising:
   a frame, the frame having a pair of spaced-apart upstanding legs;
   a first well side cross member and first dock side cross member connected to and extending between the upstanding legs;
   a reciprocable slide bar mounted to the cross members and vertically reciprocable thereto;
   a motor configured to vertically reciprocate the slide bar;
   a tension strap configured to secure the well pump against a wellhead;
   a first pair of laterally spaced securement brackets connected to the first well side cross member and having flanges extending transversely therefrom, the flanges defining a truncated V-shaped engagement surface positioned to engage the wellhead;
   a second well side cross member and second dock side cross member connected to and extending between the upstanding legs, the first pair of securement brackets connected to the first well side cross member; and
   a second pair of laterally spaced securement brackets connected to the second well side cross member.

6. The well pump of claim 5, the first and second securement brackets comprising laterally adjustable securement brackets.

7. The well pump of claim 5 further comprising roller bearings mounted to the well side and dock side cross members and engaging the slide bar.

8. The well pump of claim 5 further comprising:
a threaded rod extending upwardly from an upper end of the slide bar;
a vertically adjustable coupling threadedly connected to the threaded rod; and
a pump rod connector extending from the vertically adjustable coupling.

9. The well pump of claim 5 further comprising:
a drive shaft extending from the motor;
a drive pulley fixed to the drive shaft;
a driven pulley fixed to a gear shaft, the gear shaft extending from a speed reducing gearbox;
an output shaft extending from the gearbox; and
a crank disk connected to the output shaft and rotatable therewith, the crank disk attached to the reciprocable slide bar.

10. The well pump of claim 9, the crank disk and slide bar being connected with a connecting rod, the crank disk having a plurality of connected rod attachment openings spaced at different distances from a center of the crank disk.

11. A well pump comprising:
a frame;
a support platform mounted to the frame;
a slide bar reciprocably mounted to the frame;
a rotatable disk connected to the slide bar;
an output shaft fixed to the rotatable disk such that rotation of the output shaft rotates the rotatable disk;
a drive shaft having a drive pulley fixed thereto;
a gear shaft with a driven pulley fixed thereto, the gear shaft extending from a speed reducing gearbox, the gearbox having an output shaft extending therefrom;
a drive belt connecting the drive pulley and driven pulley;
a second auxiliary input shaft extending from the gearbox in a direction opposite the output shaft and connected to the output shaft, each of the drive shaft, the gear shaft and second auxiliary input shafts being independently connectable to a power source and operable as an input shaft to rotate the output shaft at different speeds.

12. The well pump of claim 11 further comprising:
well side and dock side cross beams connected to the frame; and
a pair of roller bearings connected between the well side and dock side cross members, the slide bar reciprocable in the roller bearings.

13. The well pump of claim 12, the well side cross beams comprising an upper well side cross beam and a lower well side cross beam, the well pump further comprising spaced apart securement brackets extending transversely from the well side cross beams and defining a V-shaped well engagement surface.

14. The well pump of claim 13 further comprising a tension strap positioned around a wellhead at the well and securing the wellhead against the securement brackets.

15. The well pump of claim 12 further comprising a pump rod connector reciprocable with the slide bar and connected to a pump rod extending from a well.

16. The well pump of claim 11 further comprising wheels attached to the frame.

\* \* \* \* \*